United States Patent
Yamasaki et al.

(10) Patent No.: US 8,565,264 B2
(45) Date of Patent: Oct. 22, 2013

(54) RADIO APPARATUS, RADIO COMMUNICATION SYSTEM, AND RADIO INFORMATION NOTIFICATION METHOD

(75) Inventors: Miki Yamasaki, Fukuoka (JP);
Kazuhisa Obuchi, Kawasaki (JP);
Hirotoshi Shimizu, Kawasaki (JP);
Akihide Otonari, Fukuoka (JP);
Yoshinori Soejima, Fukuoka (JP);
Shinya Okamoto, Fukuoka (JP); Chiaki Shinohara, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 1055 days.

(21) Appl. No.: 12/155,942

(22) Filed: Jun. 11, 2008

(65) Prior Publication Data

US 2009/0041055 A1 Feb. 12, 2009

(30) Foreign Application Priority Data

Aug. 10, 2007 (JP) .................. 2007-210158

(51) Int. Cl.
*H04J 3/16* (2006.01)
(52) U.S. Cl.
USPC .......................................... 370/469
(58) Field of Classification Search
USPC .......................................... 370/469
See application file for complete search history.

(56) References Cited

U.S. PATENT DOCUMENTS

| | | | |
|---|---|---|---|
| 6,292,496 B1 * | 9/2001 | Rasanen ................. | 370/503 |
| 2003/0016698 A1 | 1/2003 | Chang et al. | |
| 2003/0232622 A1 | 12/2003 | Seo et al. | |
| 2004/0100958 A1 * | 5/2004 | Peng ...................... | 370/392 |
| 2004/0228313 A1 | 11/2004 | Cheng et al. | |
| 2005/0039101 A1 | 2/2005 | Torsner | |
| 2005/0141421 A1 | 6/2005 | Ishii et al. | |
| 2005/0163111 A1 | 7/2005 | Ishii et al. | |
| 2005/0259661 A1 | 11/2005 | Ishii et al. | |
| 2006/0007886 A1 * | 1/2006 | Lee et al. ................ | 370/329 |
| 2006/0165045 A1 | 7/2006 | Kim et al. | |
| 2006/0190610 A1 | 8/2006 | Motegi et al. | |
| 2006/0198338 A1 | 9/2006 | Ishii et al. | |
| 2007/0091810 A1 | 4/2007 | Kim et al. | |
| 2007/0115874 A1 | 5/2007 | Usuda et al. | |

FOREIGN PATENT DOCUMENTS

| | | |
|---|---|---|
| EP | 1 341 318 A2 | 9/2003 |
| EP | 1 764 942 A2 | 3/2007 |
| JP | 03250239 A * | 11/1991 |
| JP | 2003-111147 | 4/2003 |

(Continued)

OTHER PUBLICATIONS

A Method to Improve the Robustness of MPEG Video Applications over wireless networks, 2000, IEEE, R.Radhakrishna Pillai and Mohan krishna Patnam, pp. 210-214.*

(Continued)

*Primary Examiner* — Mark Rinehart
*Assistant Examiner* — Maharishi Khirodhar
(74) *Attorney, Agent, or Firm* — Fujitsu Patent Center

(57) ABSTRACT

MAC entity produces a single PDU in such a way that two or more SDU's, which are received from RLC entity via logical channels, are integrated, and header H and MAC control information CONT are added. Transmission order information (time stamp TS) is added to the PDU. The PDU including the transmission order information is transferred to a transport channel, and then transmitted on a radio basis to an apparatus of the other party.

4 Claims, 14 Drawing Sheets

(56) References Cited

FOREIGN PATENT DOCUMENTS

| | | |
|---|---|---|
| JP | 2004-31290 | 1/2004 |
| JP | 2004-343765 | 12/2004 |
| JP | 2005-510950 | 4/2005 |
| JP | 2005-130053 | 5/2005 |
| JP | 2005-191745 | 7/2005 |
| JP | 2005-236918 | 9/2005 |
| JP | 20060020044 | 1/2006 |
| JP | 2006-211015 | 8/2006 |
| JP | 2006-217085 | 8/2006 |
| JP | 2006-279944 | 10/2006 |
| JP | 2006-340169 | 12/2006 |
| JP | 2007-124048 | 5/2007 |
| JP | 2007-129673 | 5/2007 |
| WO | WO 2006/052085 A1 | 5/2006 |

OTHER PUBLICATIONS

Japanese Patent Office Action issued in Japanese Patent Application 2007-210158 (dated Jun. 23, 2009).
http://www.3gpp.org/.
Extended European Search Report mailed Aug. 12, 2013 for corresponding European Application No. EP 08 15 7583 (in English-language).

* cited by examiner

RADIO APPARATUS, RADIO COMMUNICATION SYSTEM, AND RADIO INFORMATION NOTIFICATION METHOD

BACKGROUND OF THE INVENTION

1. Field of the Invention

The present invention relates to a radio apparatus, a radio communication system, and a radio information notification method.

2. Description of the Related Art

Recently, there is widely adopted the protocol of a radio communication system that is called 3G (3rd generation).

There are some developmental stages also in this 3G. The cellular phone that adopts the protocol that is called 3.5G or HSDPA in which the transmission rate is sped up further, as well as the original 3G that is adopted in FOMA and the like, has appeared, too. In addition, the protocol that is called Super 3G or 3.9G is examined now.

The protocol in the radio communication system of group of this 3G is divided into two or more layers, and layer 2 of those layers is composed of three sub-layers of MAC (Medium Access Control), RLC (Radio Link Control) and PDCP (Packet Date Convergence Protocol).

FIG. 1 is a construction view of a protocol.

Layer 1 is a layer that is called a physical layer, and the layer 1 is a part which takes charge of an actual communication.

Layer 2, which is the upper layer, is composed of three sub-layers of MAC, RLC and PDCP.

Here, the mass of one processing function arranged in one layer or one sub-layer is called entity (entity). The PDCP entity and the RLC entity correspond to each LCH (Logical Channel: logical channel) and exist by the number of LCH to be used, and perform transmitting-receiving of PDU (Protocol Data Unit) having a one-to-one correspondence. Here, in the PDCP entity, the processing such as the concealment of data is done in 3.9G (Super 3G), and in the RLC entity, the processing such as the control of retransmission of data is done.

Moreover, in the MAC entity, PDU that has been forwarded from each RLC entity through each LCH is integrated into one PDU, and the integrated PDU is forwarded through TRCH (Transport Channel) to the layer 1 that is the subordinate position layer.

At the receiving side, the MAC entity divides the PDU, which is transferred from the layer 1 through the TRCH, into one or two or more PDU, and transfers the divided individual PDU through individual LCH to individual RLC entity.

Incidentally, though layer 3 exists, too, the illustration and the explanation are omitted because it is irrelevant directly to the present invention described later.

Here, in individual PDU, the mechanism that information can be exchanged with the opposing side by giving not only the user data but also the control information necessary for the entity on the opposing side is being examined by 3GPP (3rd Generation Partnership Project).

According to this examination, it is possible for individual entity of the transmission side to transmit the control information to the opposing entity of the receiving side. More in detail, for instance, when the PDCP entity of LCH#1 of PDCP sub-layer applies the control information to data and transfers the same to the RLC entity, the PDCP entity of LCH#1 on the receiving side can be operated in accordance with the control information referring to the control information. In a similar fashion to this, for instance, when the RLC entity of LCH#2 applies the control information to data and transfers the same to the MAC entity, the RLC entity of LCH#2 on the receiving side can be operated in accordance with the control information referring to the control information. As for the MAC entity, it is similar.

Here, it pays attention about the control information given by the MAC entity, and, in the following, it explains the control information given by the MAC entity.

FIG. 2 is a view showing data format of PDU including control information applied in the MAC entity. FIG. 2 shows only the RLC sub-layer and the MAC sub-layer at the transmission side.

The PDU shown in FIG. 2 has a data format in which SDU's, that are received from four RLC entities placed on the RLC sub-layers of four logical channels, are integrated, and header H and MAC control information are added. This PDU is transferred to the layer 1 so that the layer 1 transmits the PDU to the receiving side on a radio basis.

FIG. 3 is a figure where the data flow of the scene where the control information is given by the MAC entity is shown.

As mentioned above, in the MAC entity at the transmission side, SDU's of four RLC entities, which are placed on the RLC sub-layers at the transmission side, are integrated, and header H and control information CONT are added so that one PDU is created. The thus created PDU is transmitted. At the receiving side, the PDU is received so that the MAC entity at the receiving side removes the header H and the control information to be separated into SDU on individual LCH. The thus separated SDU is transferred to the associated RLC entity. The MAC entity at the receiving side operates in accordance with the removed control information.

FIG. 3 shows that the above-mentioned data flow is repeated for one communication. Incidentally, for the purpose of making it plainly here, it is shown that data is simply transmitted from one sending end to other receiving side. However, in an actual communication, the transmission and the reception are mutually complicated and it is repeated two or more times.

FIG. 4 is an explanatory view useful for understanding problems in the data flow explained in conjunction with FIG. 2 and FIG. 3.

PDU's of PDU#1, PDU#2, and PDU#3 are shown here. It is assumed that the first PDU#1 is normally received, the second PDU#2 fails in the reception due to the defect of the communication path for instance, and the third PDU#3 is normally received. It is assumed that the second PDU#2, which fails in the reception, is transmitted again later than the third PDU#3, and the PDU#2 that is retransmitted is normally received.

The MAC entity on the receiving side operates first in accordance with the control information on the PDU#1 at the time of the reception of PDU#1, and, next, does not perform operation according to the control information as for PDU#2 at that time because it failed in the reception, and operates in accordance with the control information on the PDU#3 at the time of the reception of the following PDU#3. And, in addition, it operates in accordance with the control information on PDU#2 that is sent again afterwards. That is, though the control information on PDU#3 is the latest control information originally, the receiving side MAC entity operates as if the control information on PDU#2 that is sent again is the latest, in the scene of FIG. 4, and there is a possibility that erroneous operation is performed.

For instance, assume that the sending end shown in FIG. 3 is a base station, and the receiving side is a cellular phone, and it is assumed that there is in PDU#1 transmitted from the base station to the cellular phone the control information directed to lower the volume of the data transmitted from the cellular phone to the base station because processing in the base station is crowded. Moreover, it is assumed that there is in PDU#2 transmitted the control information directed that it is acceptable to greatly raise the volume of the data to be transmitted from the cellular phone to the base station because processing in the base station becomes empty. In addition, it is assumed that there is in PDU#3 transmitted the control information directed that the volume of the data to be transmitted from the cellular phone to the base station is to be lowered greatly because processing in the base station is crowded again.

In this case, the cellular phone will be misunderstood with the one that it is possible to transmit by greatly raising volume of data to the base station because it is received delaying PDU#2 though the cellular phone will transmit data to the base station while greatly limiting volume of data after PDU#3 is received if PDU#3 is received back than PDU#2. In this case, the processing performance is exceeded for the base station, and the state that the data transmitted from the cellular phone cannot be processed might be caused.

Moreover, in a case where the control information on PDU#2 is a control signal which directs reset to return the receiving side to the initial state, PDU#2 is reset in accordance with the timing not originally intended, at which timing PDU#2 is sent again, and it is likely not to be communicated normally.

SUMMARY OF THE INVENTION

The present invention has been made in view of the above circumstances and provides a radio apparatus and a radio information notification method wherein data is transmitted in such a way that it is possible to recognize that the data which is retransmitted is the data which should be received originally in the previous timing, a radio communication system having such a radio apparatus, and a radio apparatus and a radio information notification method capable of recognizing that the data which is retransmitted is the data which should be received originally in the previous timing, at the receiving side without relying on the device with the sending end.

A first radio apparatus including:

a data processing section that is placed at MAC sub-layer that mediates data transmission between a transport channel and two or more logical channels, wherein the data processing section sends out data to the transport channel in such a way that data received from two or more logical channels are integrated, and control information to be transferred to an associated entity that is placed at MAC sub-layer of a receiving side is added; and a data transmission section that is placed at a physical layer, wherein the data transmission section receives data transmitted from the data processing section via the transport channel and transmits the received data by radio, wherein the data processing section sends out data to the transport channel in such a way that data received from two or more logical channels are integrated, the control information is added, and transmission order information representative of transmission order is added.

According to the first radio apparatus of the present invention, the data processing section (MAC entity) generates data (PDU) wherein the control information is added and in addition the transmission order information is added. Therefore, in reception MAC entity on the opposing side, it is possible to know before and behind the timing to be originally received for data (PDU) now received and data (PDU) received before the now received data. This feature makes it possible to avoid a careless operation according to the control information added to the data received delaying.

In the radio apparatus according to the present invention as mentioned above, it is acceptable that the data processing section sends out data to the transport channel, when specified type of control information of the control information is added, in such a way that the control information is added, and in addition the transmission order information is added.

In some types of control information, there is control information not asked before and after the reception, and thus it is acceptable to add transmission order information only to the control information that involves a problem as to before and after the reception.

In the radio apparatus according to the present invention as mentioned above, it is acceptable that the data processing section adds the transmission order information in the control information. Alternatively, it is acceptable that the data processing section adds the transmission order information in a header.

In the MAC entity at the reception side, it is possible to refer to the header and the control information which are added by the data processing section (the MAC entity at the transmission side). Therefore, the transmission order information may be added in the control information, and may be added in the header.

In the radio apparatus according to the present invention as mentioned above, it is acceptable that the data processing section adds time information representative of time of a first transmission, as the transmission order information.

Though it is unquestionable for transmission order information as long as there is information on the transmission order, it is acceptable that time information representative of time of a first transmission is added.

A radio communication system including: the radio apparatus according to claim 1; and a radio apparatus including a data receiving section that is placed at a physical layer, wherein the data receiving section receives data transmitted by radio and transmits the data to a transport channel, and a data processing section that is placed at MAC sub-layer that mediates data transmission between the transport channel and two or more logical channels, wherein the data processing section operates in accordance with control information that is added to data received from the transport channel, so that the control information is removed from the data to separate the data into data associated with individual logical channel and distribute the data to individual logical channel, and wherein the data processing section determines a transmission order based on the transmission order information, and performs an operation according to an effect that the control information is received in delay, as to the control information added to data received in delay out of the transmission order.

According to the radio communication system as mentioned above, it is possible to prevent a careless operation based on the control information added to data (PDU) received delaying.

A second radio apparatus including:

a data receiving section that is placed at a physical layer, wherein the data receiving section receives data transmitted by radio and transmits the data to a transport channel; and a data processing section that is placed at MAC sub-layer that mediates data transmission between the transport channel and two or more logical channels, wherein the data processing section operates in accordance with control information that is added to data received from the transport channel, so that the control information is removed from the data to separate the data into data associated with individual logical channel and distribute the data to individual logical channel, wherein the data receiving section comprises:

a retransmission demand section that demands retransmission of data to a data transmission side, when the data receiving section fails in reception of the data transmitted by radio; and a receiving time storage section that stores receiving time of a first failure in reception on individual data failed in reception, and wherein when the data receiving section succeeds in reception of data, the data receiving section adds time of a first reception including failed reception, of this-time receiving data, to the receiving data, and then transfers the receiving data to the data processing section.

In the radio apparatus according to the present invention as mentioned above, it is preferable that the data processing section judges a transmission order in accordance with the time, and performs an operation according to an effect that the control information is received in delay, on the control information added to data received in delay out of the transmission order.

According to the second radio apparatus of the present invention as mentioned above, when the data receiving section fails in the reception of data, a retransmission is demanded, and there is stored the reception time of the first failure in the reception of the data that fails in the reception. When it succeeds in the reception of data that is retransmitted, the reception time of the first failure in the reception of the data, which is stored, is added to the received data, and then transferred to the data processing section (MAC entity). In the MAC entity, it is possible to know the order by which it had to receive originally, and to prevent a careless operation based on the control information added to the data that is sent again delaying.

A first radio information notification method in a radio apparatus including:

a data processing section that is placed at MAC sub-layer that mediates data transmission between a transport channel and two or more logical channels, wherein the data processing section sends out data to the transport channel in such a way that data received from two or more logical channels are integrated, and control information to be transferred to an associated entity that is placed at MAC sub-layer of a receiving side is added; and a data transmission section that is placed at a physical layer, wherein the data transmission section receives data transmitted from the data processing section via the transport channel and transmits the received date by radio, wherein the data processing section has a step of sending out data to the transport channel in such a way that data received from two or more logical channels are integrated, the control information is added, and transmission order information representative of transmission order is added.

A second radio information notification method in a radio apparatus including:

a data receiving section that is placed at a physical layer, wherein the data receiving section receives data transmitted by radio and transmits the data to a transport channel; and a data processing section that is placed at MAC sub-layer that mediates data transmission between the transport channel and two or more logical channels, wherein the data processing section operates in accordance with control information that is added to data received from the transport channel, so that the control information is removed from the data to separate the data into data associated with individual logical channel and distribute the data to individual logical channel, wherein the data receiving section includes:

a step of demanding retransmission of data to a data transmission side, when the data receiving section fails in reception of the data transmitted by radio, and storing receiving time of a first failure in reception on individual data failed in reception; and a step wherein when the data receiving section succeeds in reception of data, the data receiving section adds time of a first reception including failed reception, of receiving data, to the receiving data, and then transfers the receiving data to the data processing section.

According to the present invention as mentioned above, it is possible to know the transmission order for the data that is sent again by which it had to receive originally, and thus to prevent a careless erroneous operation.

DETAILED DESCRIPTION OF THE INVENTION

Embodiments of the present invention will be described with reference to the accompanying drawings.

Figure 1:
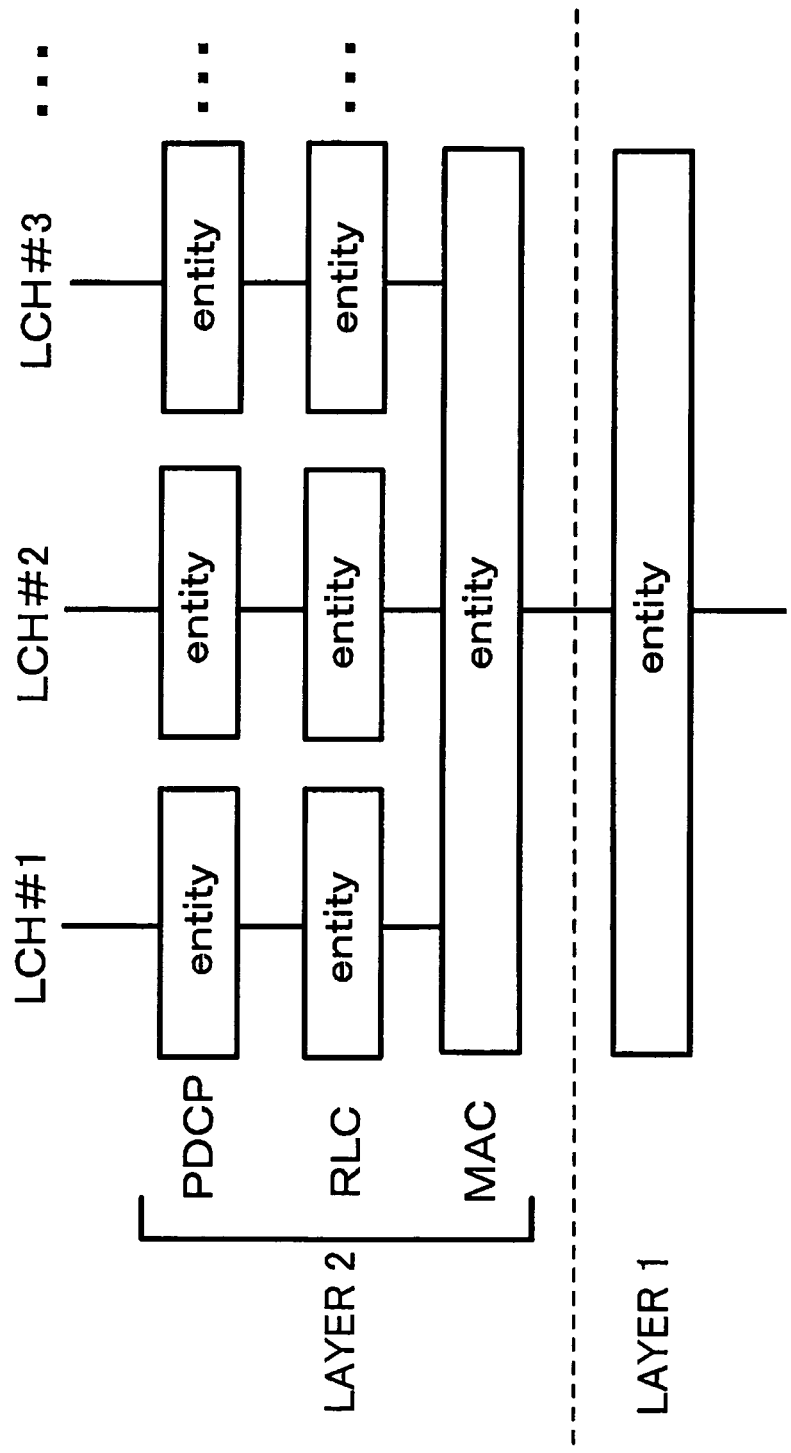
FIG. 1 is a construction view of a protocol.
Figure 2:
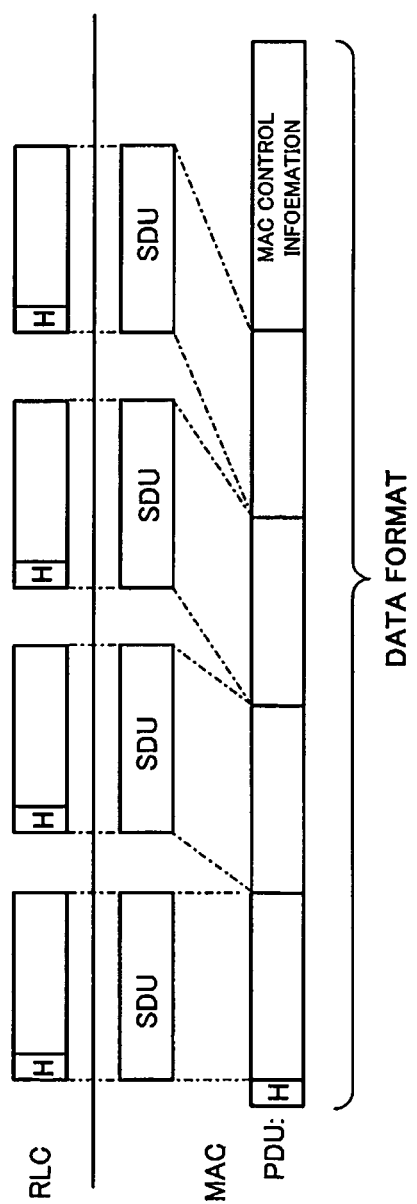
FIG. 2 is a view showing data format of PDU including control information applied in the MAC entity.
Figure 3:
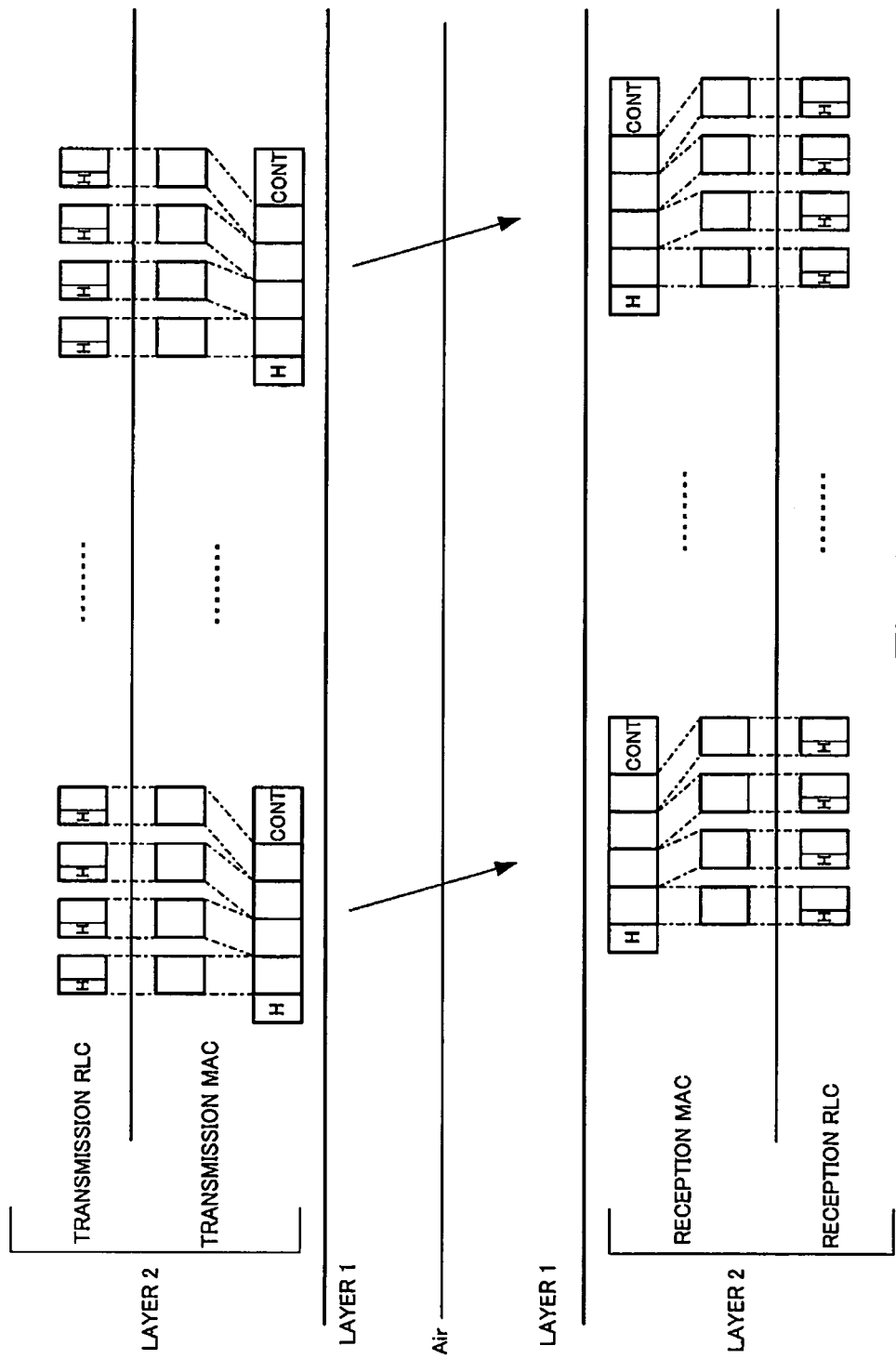
FIG. 3 is a figure where the data flow of the scene where the control information is given by the MAC entity is shown.
Figure 4:
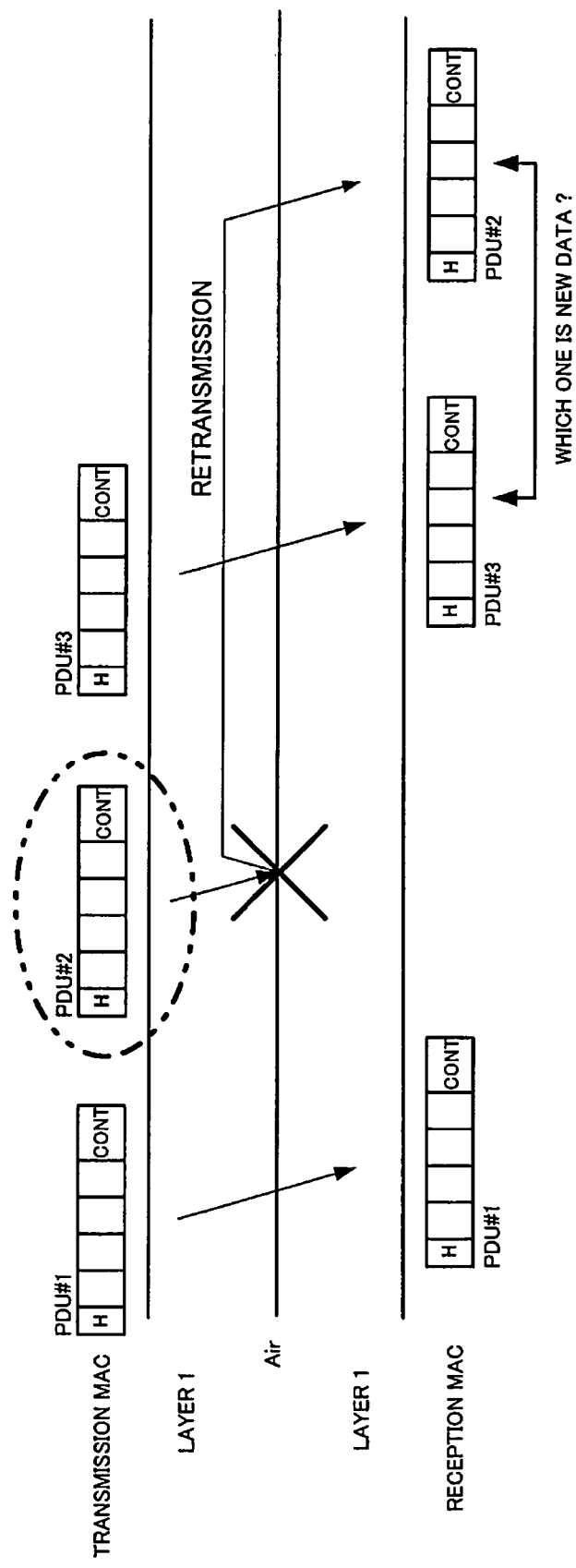
FIG. 4 is an explanatory view useful for understanding problems in the data flow explained in conjunction with FIG. 2 and FIG. 3.
Figure 5:
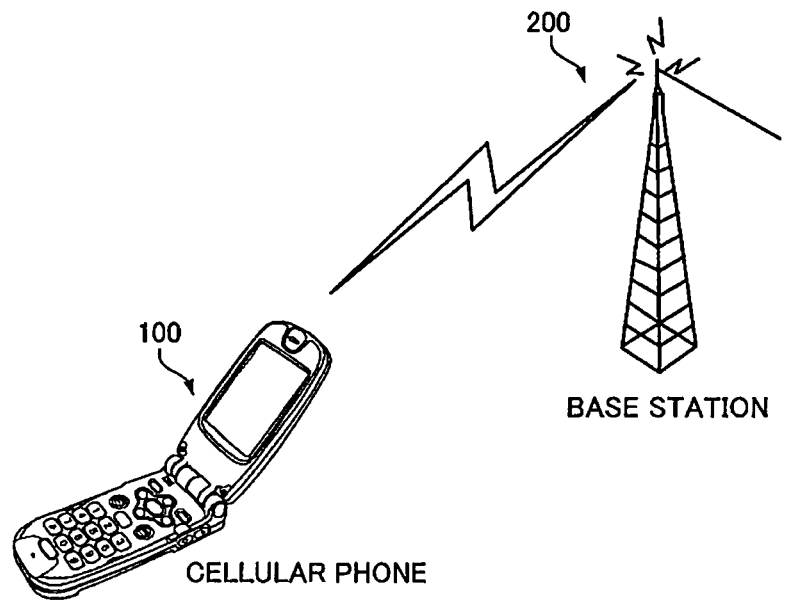
FIG. 5 is a typical illustration of an example of a communication system to which an embodiment of the present invention is applied.

FIG. 5 is a typical illustration of an example of a communication system to which an embodiment of the present invention is applied.

FIG. 5 shows a cellular phone 100 and a base station 200 that performs a radio communication with the cellular phone 100.

A lot of cellular phones and a lot of base stations exist in an actual telecommunication system, a lot of exchanges etc. exist in addition, too and only a minimum composition necessary for the explanation of the present embodiment is shown in the figure here.

When a radio communication is performed between the cellular phone 100 and base station 200, the base station 200 becomes a receiving side when the cellular phone 100 is positioned on a sending side, and the cellular phone 100 becomes a sending side when the base station 200 is positioned on the sending side. That is, the composition at the sending end and the composition of the receiving side are prepared for in both the cellular phone 100 and the base station 200.

Figure 6:
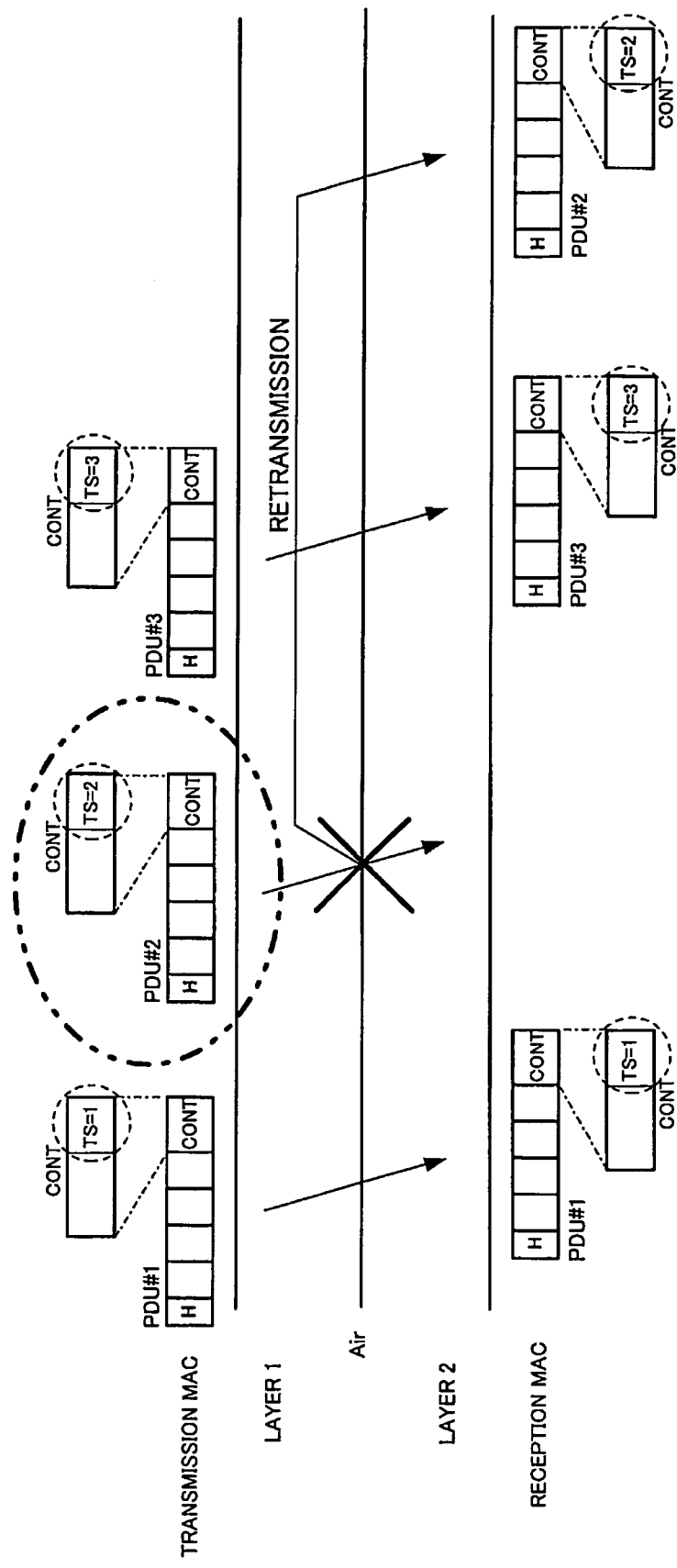
FIG. 6 is a view showing the data flow in a first embodiment of the present invention.

FIG. 6 is a view showing the data flow in a first embodiment of the present invention.

Here the MAC entity at the transmission side generates PDU that adds MAC control information CONT including time stamp TS that is indicative of the transmission.

More in detail, according to the example shown in FIG. 6, in the MAC entity at the transmission side, as to PDU#1 which is to be transmitted first, MAC control information CONT including time stamp TS=1 is added, as to PDU#2 which is to be transmitted second, MAC control information CONT including time stamp TS=2 is added, and as to PDU#3 which is to be transmitted third, MAC control information CONT including time stamp TS=3 is added.

At the receiving side, according to the example shown in FIG. 6, PDU#1 is normally received, as for PDU#2, it fails in the reception and is performed the demand of sending again, PDU#3 is normally received, and as for PDU#2, which is sent again thereafter, is normally received.

In the MAC entity at the receiving side, the time stamp TS is monitored, so that it is understood to have received PDU#2 of time stamp TS=2 afterwards the reception of PDU#3 of time stamp TS=3. Accordingly, as to the MAC control information CONT on PDU#2, there is performed a treatment that the sending end is notified of such matters that the control information is disregarded in the event that in some type of the control information the operation based on the control information is already unnecessary, or that the operation based on the control information causes the evil, or alternatively, in other type of the control information, the control information is disregarded because the control information reaches delaying.

This feature makes it possible to implement more smooth communication as comparing with a case where control information, which is applied to the received PDU, is mechanically processed.

Figure 7:
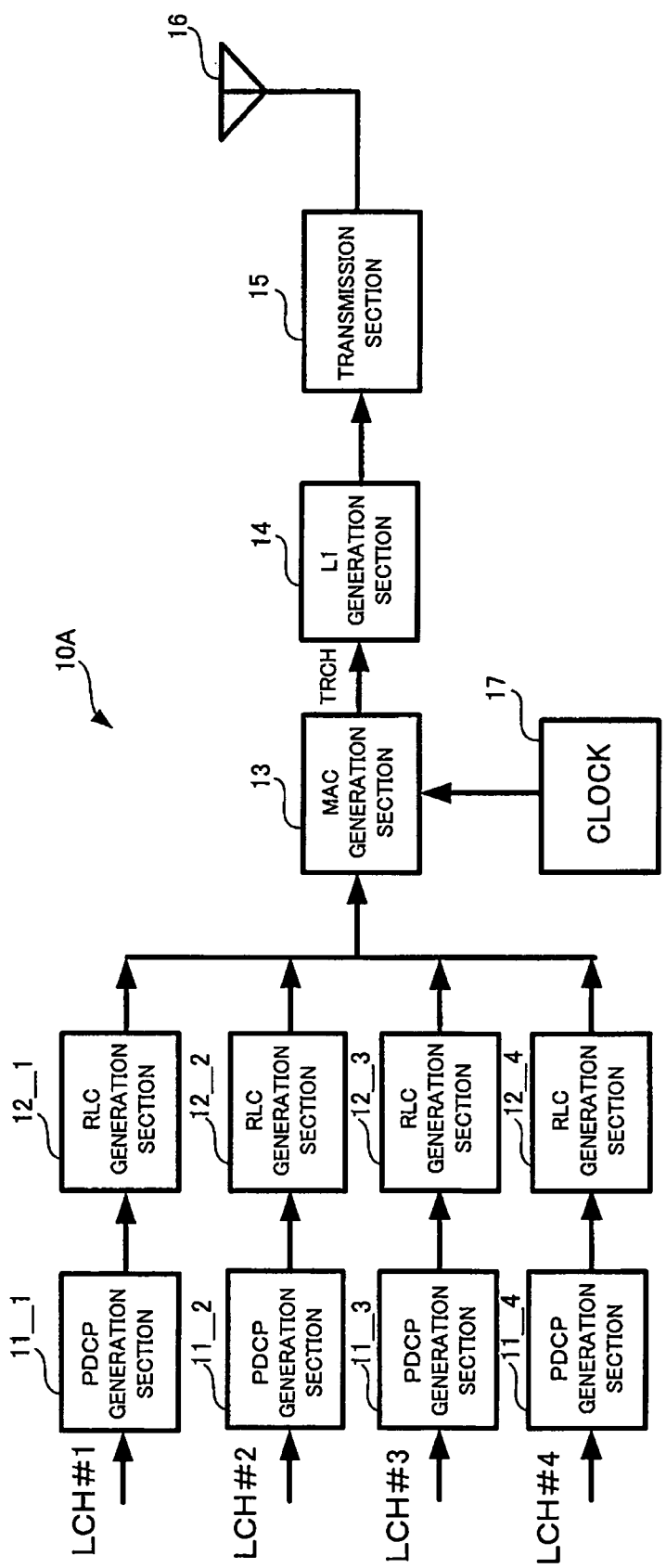
FIG. 7 is a block diagram of a radio transmitting apparatus according to a first embodiment of the present invention.

FIG. 7 is a block diagram of a radio transmitting apparatus according to a first embodiment of the present invention.

A radio transmitting apparatus 10A has four logical channels LCH#1, LCH#2, LCH#3, and LCH#4. Those logical channels LCH#1, LCH#2, LCH#3, and LCH#4 are provided with PDCP generation sections 11_1, 11_2, 11_3, and 11_4, respectively, and RLC generation sections 12_1, 12_2, 12_3, and 12_4, respectively. Further, there is prepared a MAC generation section 13 between the logical channels LCH#1, LCH#2, LCH#3, and LCH#4 and a transport channel TRCH.

The PDCP generation sections 11_1, 11_2, 11_3, and 11_4 apply concealment processing (encryption processing) to data received from the logical channels LCH#1, LCH#2, LCH#3, and LCH#4, respectively, and transfer the thus processed data to the RLC generation sections 12_1, 12_2, 12_3, and 12_4, respectively. The RLC generation sections 12_1, 12_2, 12_3, and 12_4 manage a transfer of data of the logical channels LCH#1, LCH#2, LCH#3, and LCH#4 to the MAC generation section 13 in such a way that the RLC generation sections 12_1, 12_2, 12_3, and 12_4 transfer the data received from the PDCP generation sections 11_1, 11_2, 11_3, and 11_4 to the MAC generation section 13 when the MAC generation section 13 offers a state that the MAC generation part 13 can receive the data, and moreover, even in case of the data passed to the MAC generation section 13 once, when there is a demand of sending again from the MAC generation section 13 due to the failure of the communication and the like, data with the demand is passed to the MAC generation section 13.

The radio transmitting apparatus 10A is provided with a clock 17. In the MAC generation section 13, when PDU is generated, the time stamp TS (Refer to FIG. 6) that indicates the transmission order is recorded in control information referring to the clock 17. Or alternatively, it is acceptable to record in control information time information indicative of the present time instead of the time stamp TS referring to the clock.

Thus, the MAC generation section 13 integrates the data received from four RLC generation sections 12_1, 12_2, 12_3, and 12_4 into one data, and adds header H and MAC control information CONT including time stamp TS or time information to create one PDU, and then transfers the thus created PDU to a L1 generation section 14 where the generated PDU is arranged in a layer 1 (physical layer). In the L1 generation section 14, the radio transmission is performed in the air by a transmission section 15 through an antenna 16.

Figure 8:
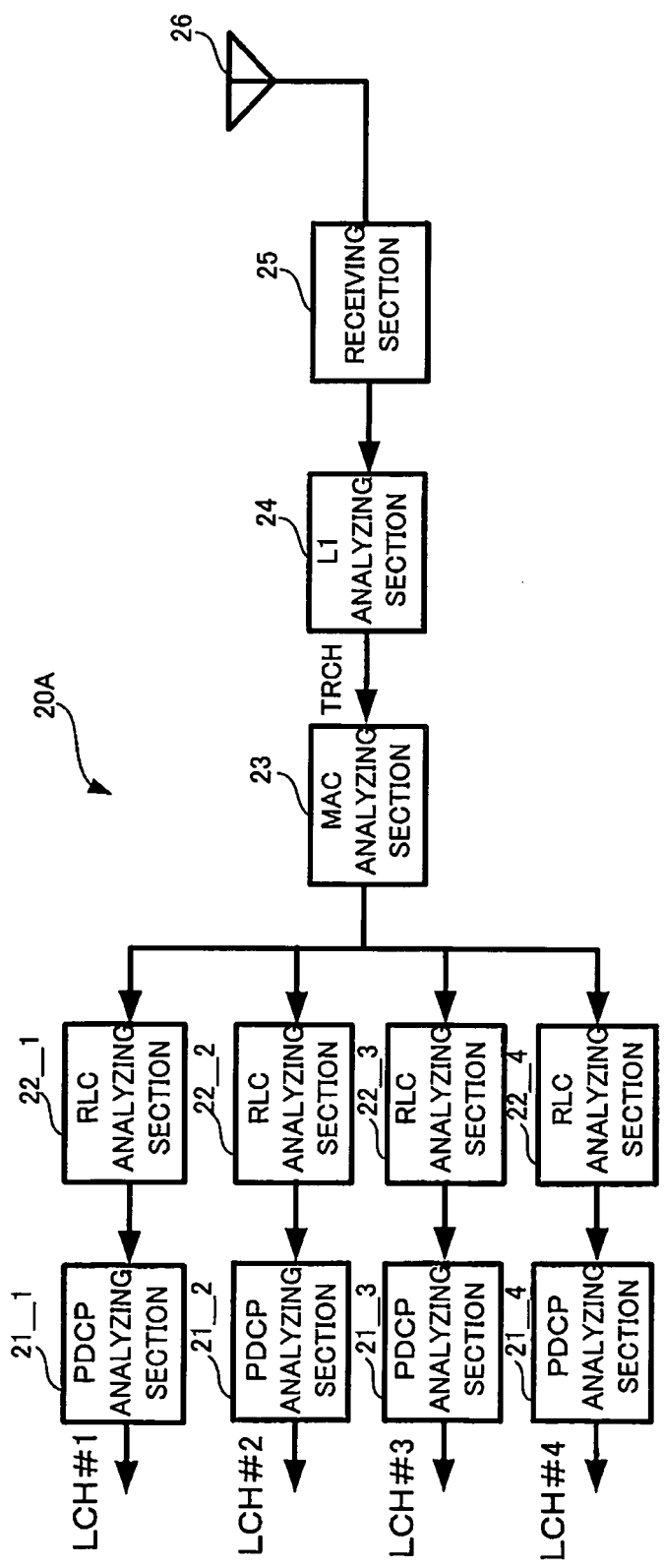
FIG. 8 is a block diagram of a radio receiving apparatus according to a first embodiment of the present invention.

FIG. 8 is a block diagram of a radio receiving apparatus according to a first embodiment of the present invention.

In a similar fashion to that of the radio transmitting apparatus 10A shown in FIG. 7, a radio transmitting apparatus 20A also has four logical channels LCH#1, LCH#2, LCH#3, and LCH#4. Those logical channels LCH#1, LCH#2, LCH#3, and LCH#4 are provided with four PDCP analyzing sections 21_1, 21_2, 21_3, and 21_4, respectively, and four RLC analyzing sections 22_1, 22_2, 22_3, and 22_4, respectively. Further, there is prepared a MAC analyzing section 23 between the logical channels LCH#1, LCH#2, LCH#3, and LCH#4 and a transport channel TRCH.

A receiving section 25 receives a radio signal through an antenna 26. A receiving signal, which is obtained by the receiving, is transmitted to a L1 analyzing section 24 constituting layer 1 (physical layer). The L1 analyzing section 24 converts the electrical receiving signal to data of format to be treated inside the apparatus. The thus converted data is transmitted to the MAC analyzing section 23.

The MAC analyzing section 23 distributes the data received from the L1 analyzing section 24 to the RLC analyzing sections 22_1, 22_2, 22_3, and 22_4. Each RLC analyzing sections 22_1, 22_2, 22_3, and 22_4 check whether the data that each should receive becomes complete. When there is data that has not been received yet, retransmission of the data is demanded from the MAC analyzing section 23. When the data that should be received becomes complete, it is transmitted to the PDCP analyzing sections 21_1, 21_2, 21_3, and 21_4 of the same logical channel. Each PDCP analyzing sections 21_1, 21_2, 21_3, and 21_4 performs the processing of the decryption of the concealment data, and it is sent off to each logical channel.

Retransmission demand processing is performed by the MAC analyzing section 23 as well as the RLC analyzing sections 22_1, 22_2, 22_3, and 22_4, if there is insufficient data at the processing stage in the MAC analyzing section 23, and also the retransmission demand processing is performed by the L1 analyzing section 24 too when the receiving signal is not received properly.

When the received data includes control information directed to the MAC analyzing section 23, which is added in the MAC generation section 13 on the opposing side, the MAC analyzing section 23 performs operation in accordance with the control information.

In this case, a time stamp TS is recorded in the control information. In the event that the control information is one which is added to the PDU that is retransmitted late, referring to the time stamp TS, there are taken in accordance with the type of the control information such measures that as to control information that has already become unnecessary or control signal where the inconvenience is caused when executing it in late timing, it is disregarded, and it is communicated to the sending end in addition, etc.

Figure 9:
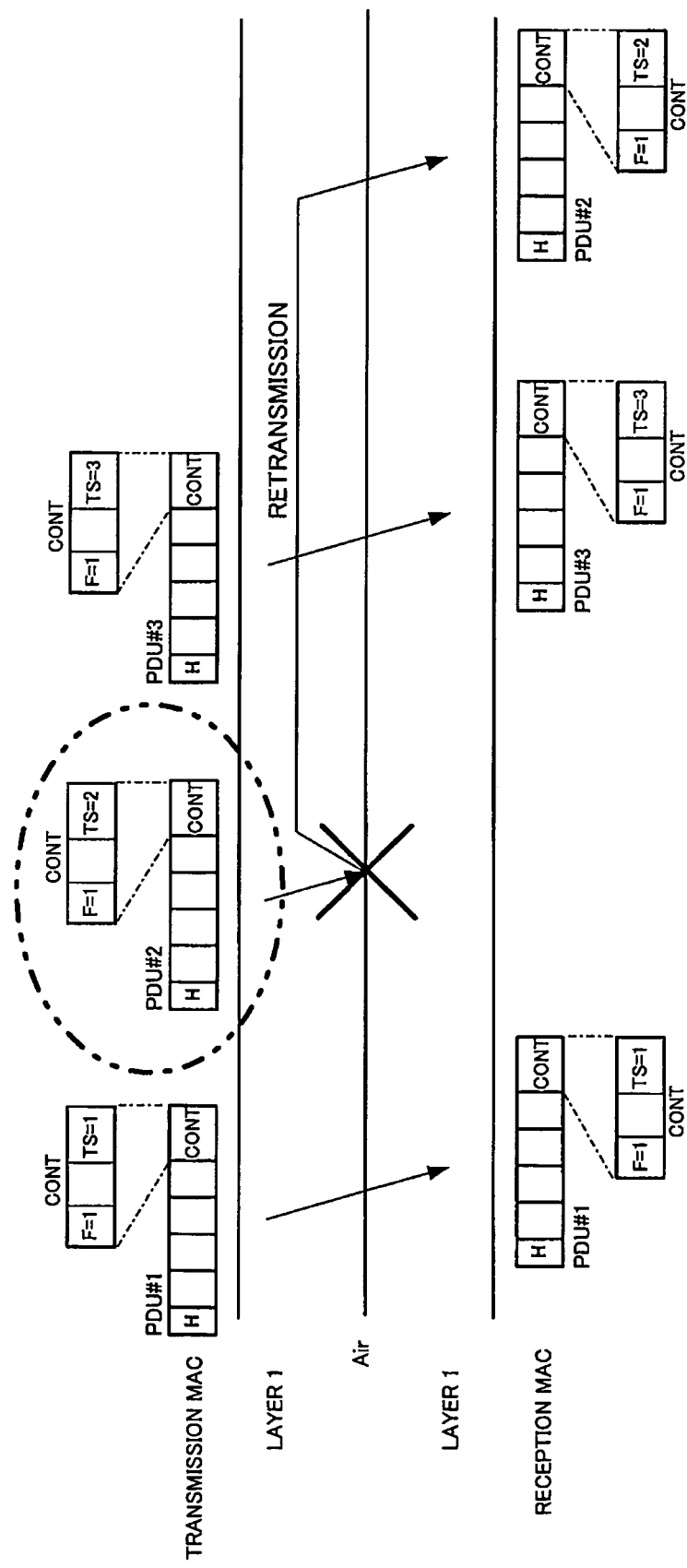
FIG. 9 is a view showing the data flow in a second embodiment of the present invention.
Figure 10:
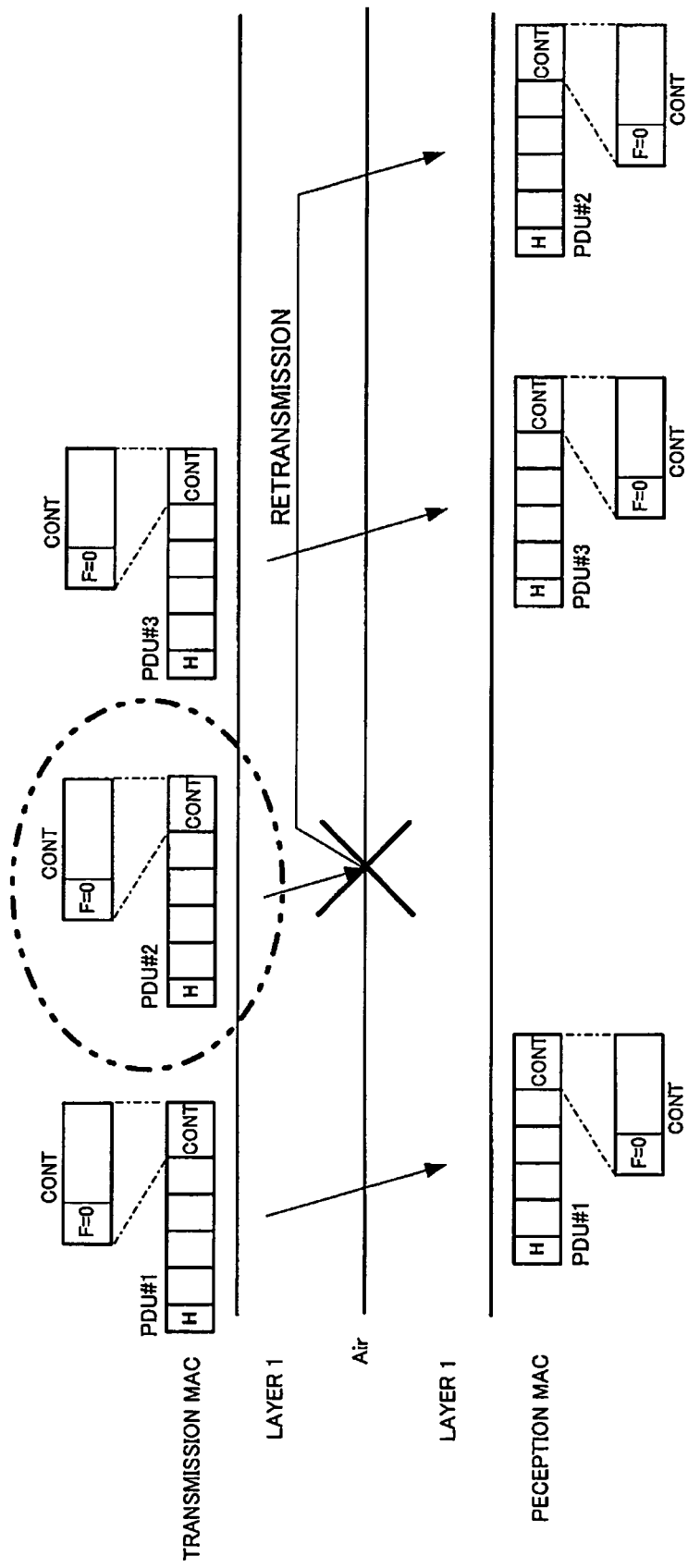
FIG. 10 is a view showing the data flow in a second embodiment of the present invention.

FIG. 9 and FIG. 10 are each a view showing the data flow in a second embodiment of the present invention.

According to the second embodiment, in case of some type of MAC control information, the MAC control information CONT, which is added in the MAC entity at the sending side, may include a flag F to determine whether the time stamp TS is to be added. The flag F=1 indicates that the time stamp TS is added, and the flag F=0 indicates that the time stamp TS is not added.

FIG. 9 shows a case of the flag F=1, that is, a case where the time stamp TS is added. The operation of the receiving side at that time is similar to the case in the first embodiment as mentioned above.

FIG. 10 shows a case of the flag F=0, that is, a case where the time stamp TS is not added. The flag F=0 means that it is the control information involving no problem even if the operation based on the control information is executed even in case of receiving in delay. And thus, as to the PDU#2 received delaying, the added control information is also executed.

Difference between the first embodiment and the second embodiment resides in the point of the presence of the flag F. Thus, hereinafter, there will be explained only the difference, referring to the radio transmitting apparatus 10A shown in FIG. 7 and the radio transmitting apparatus 20A shown in FIG. 8.

According to the radio transmitting apparatus 10A shown in FIG. 7, the MAC generation section 13 adds the MAC control information in accordance with the type of MAC control information in such a way that regarding the MAC control information which is not to be executed when the receiving is delayed, the flag F=1 is added, and the time stamp TS is added, and regarding the MAC control information which is to be executed even when the receiving is delayed, the flag F=0 is added, and the time stamp TS is not added.

According to the MAC analyzing section 23 of the radio transmitting apparatus 20A shown in FIG. 8, in the event that the MAC control information is added to the received PDU, the flag F is referred to. When the flag F=1 is confirmed, the time stamp TS is referred to, so that regarding the MAC control information that is added to the PDU received in the original order it is executed, and regarding the MAC control information that is added to the PDU received in delay, it is disregarded.

On the other hand, When the flag F=0 is confirmed, it is operated in accordance with the MAC control information that is added to the PDU, regardless of whether the PDU is received in delay.

Figure 11:
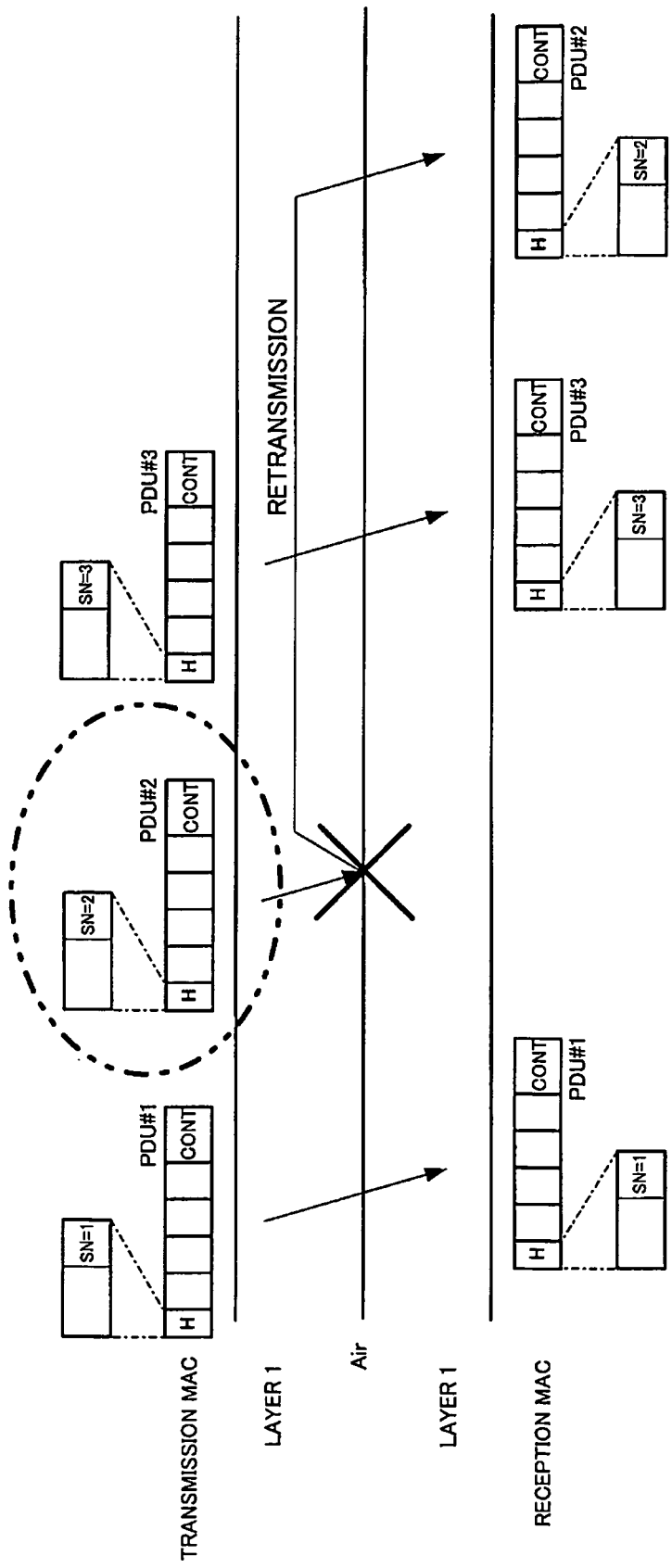
FIG. 11 is a view showing the data flow in a third embodiment of the present invention.

FIG. 11 is a view showing the data flow in a third embodiment of the present invention.

According to the first embodiment, in the MAC entity at the sending side, the MAC control information includes the time stamp TS. To the contrary, according to the third embodiment shown in FIG. 11, the header H includes a serial number SN which is indicative of the transmission order, in stead of the matter that the MAC control information includes the time stamp TS. Thus, according to the MAC entity at the sending side, the serial number SN included in the header H of the received PDU is referred to. Other respects are similar to the first embodiment mentioned above.

Here, again, there will be explained only the difference with the first embodiment, referring to the radio transmitting apparatus 10A shown in FIG. 7 and the radio transmitting apparatus 20A shown in FIG. 8.

According to the MAC generation section 13 of the radio transmitting apparatus 10A shown in FIG. 7, the serial number SN is written into the header H of the PDU whenever the PDU is generated. Here, because the number of serials is written without any relation to time, clock 17 is unnecessary specifying it.

In the MAC analyzing section 23 of the radio transmitting apparatus 20A shown in FIG. 8, the serial number SN, which is written into the header H of the received PDU, is referred to so as to determine whether it is PDU received delaying in such an extent that the receiving order is changed. And in accordance with the judgment result, the control information that is added to the PDU received in the original order is executed, and the control information that is added to the PDU received delaying behind the original order is disregarded.

Figure 12:
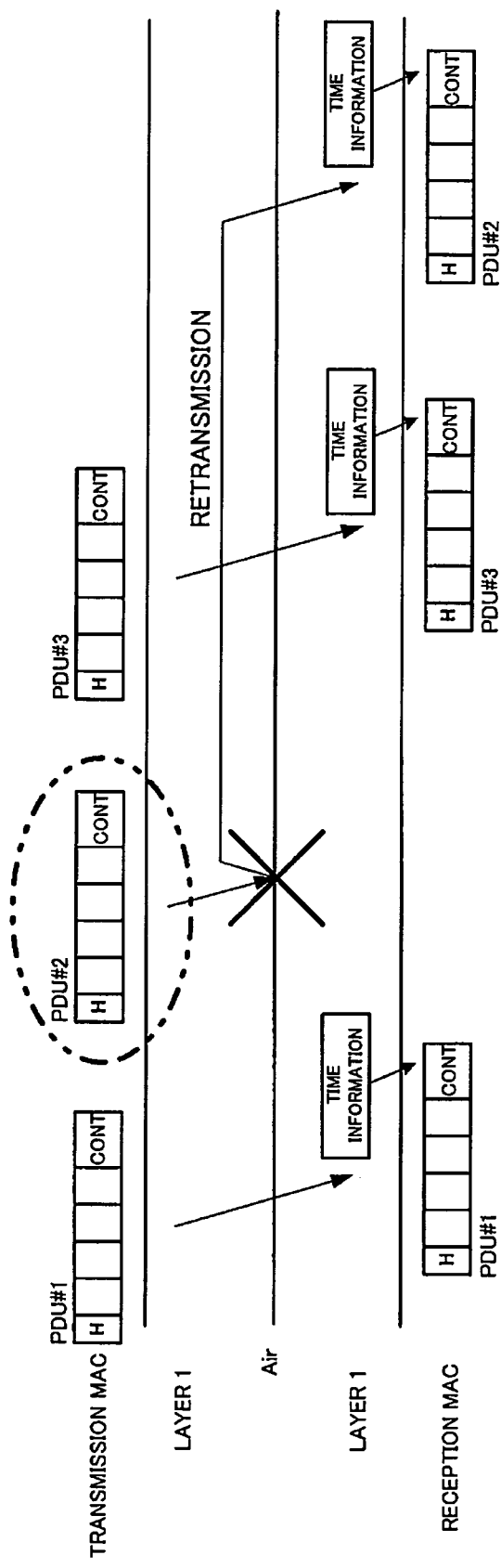
FIG. 12 is a view showing the data flow in a fourth embodiment of the present invention.

FIG. 12 is a view showing the data flow in a fourth embodiment of the present invention.

According to the fourth embodiment, in the transmission side MAC entity, information that indicates the transmission order is not added to the PDU as it is. But time information, which is indicative of the receiving time of the PDU, is written into the MAC control information of the PDU that is received by the layer 1 (physical layer) at the receiving side, and then transferred to the receiving side MAC entity. Regarding the PDU which fails in receiving and requests retransmission, the receiving time of the first failure in receiving is stored, and when the receiving succeeds by retransmission, time information, which is indicative of the receiving time stored thus of the first failure in receiving, is written into the received PDU, and then transferred to the receiving side MAC entity. In receiving side MAC entity, it is judged whether it is PDU received delaying behind the original receiving order by referring to time information written in the layer 1 (physical layer). The judgment result is reflected on the control information.

Figure 13:
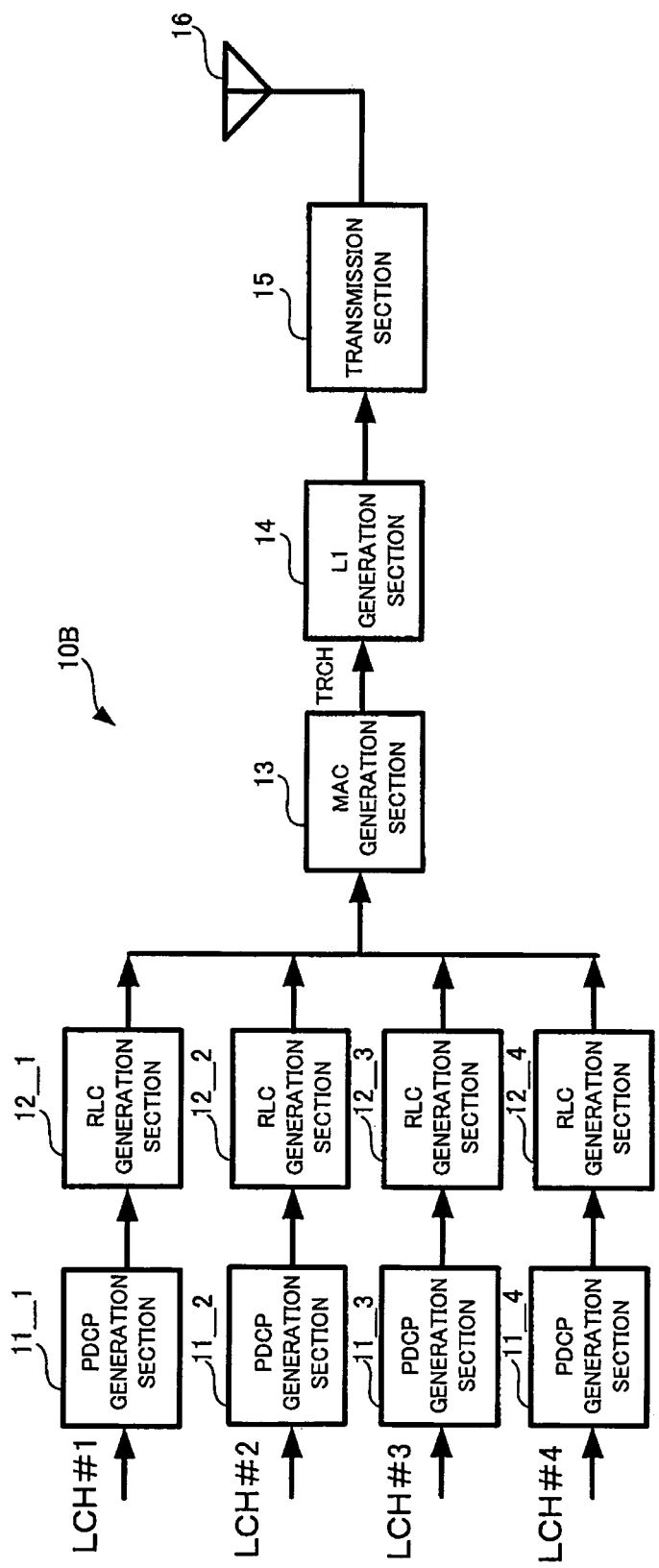
FIG. 13 is a block diagram of a radio transmitting apparatus according to a fourth embodiment of the present invention.

FIG. 13 is a block diagram of a radio transmitting apparatus according to a fourth embodiment of the present invention.

As for radio transmitting apparatus 10B shown in FIG. 13, only some operation of the MAC generation section 13 is different compared with the radio transmission apparatus 10A shown in FIG. 7.

According to the MAC generation section 13 shown in FIG. 13, as explained in conjunction with FIG. 12, even in a case where the MAC control information is added to the PDU, information indicative of the transmission order or time information are not added in the MAC control information and in the header H.

The explanation is omitted as other respects are similar to the case of the radio transmission apparatus 10A shown in FIG. 7.

Figure 14:
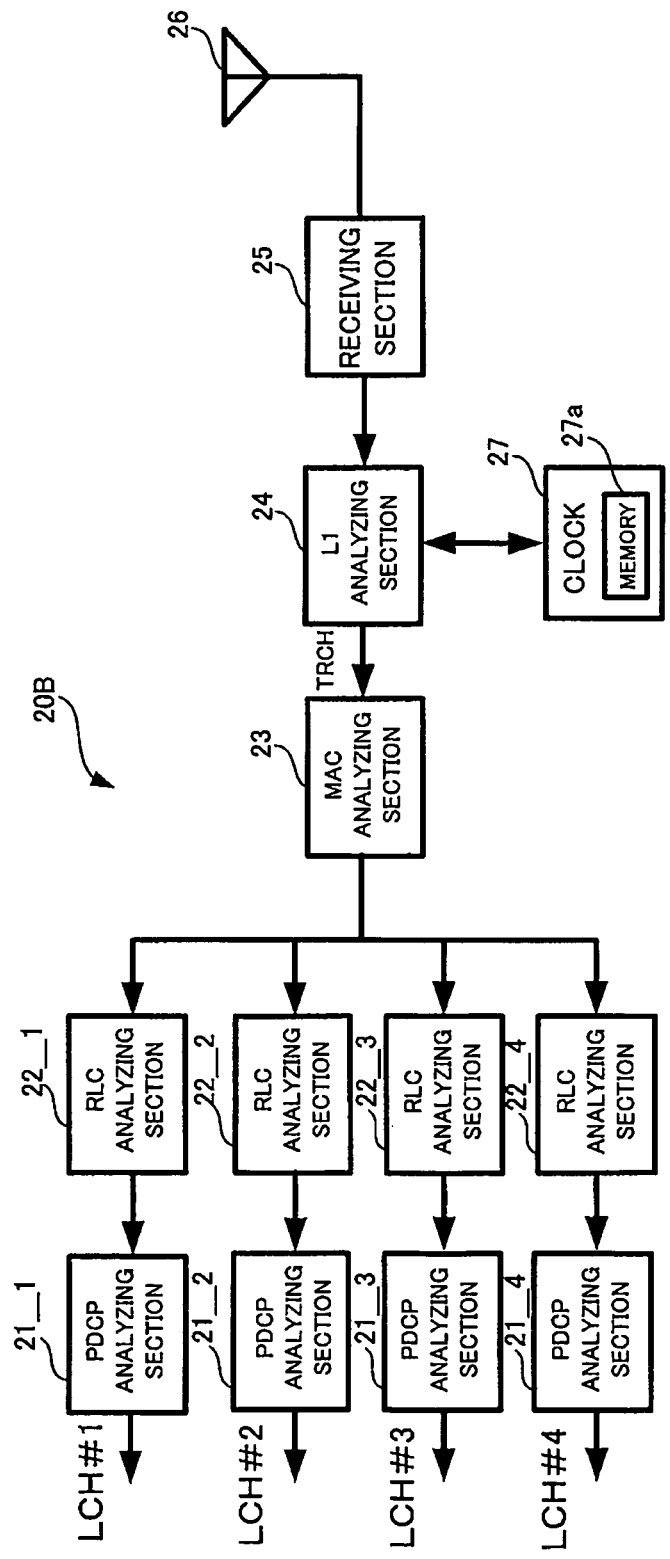
FIG. 14 is a block diagram of a radio receiving apparatus according to a fourth embodiment of the present invention.

FIG. 14 is a block diagram of a radio receiving apparatus according to a fourth embodiment of the present invention.

A radio receiving apparatus 20B shown in FIG. 14 is provided with a clock 27 with a memory 27a to which time is memorized. An L1 analyzing section 24 refers to the clock 27 at each reception to create PDU wherein the receiving time is added in the control information. The L1 analyzing section 24 transfers the thus created PDU to a MAC analyzing section 23. When the L1 analyzing section 24 fails in reception, the L1 analyzing section 24 originates the demand of retransmission to the sending end, and causes the memory 27a to store the reception time in failure. When the same data as data that fails in receiving is retransmitted and it succeeds in the reception, the time stored in the memory 27a is added to the data that is retransmitted. Alternatively, it is acceptable that both the time stored in the memory 27*a* and the receiving time of the retransmission are added. Even in the event that it succeeds in the reception after it fails in reception of the same data two or more times, the receiving time of the first failure in reception is added.

The MAC analyzing section 23 recognizes the original transmission order of referring to information of time in control information on PDU that is sent from the L1 analyzing section 24, and judges whether it is received like the original transmission order or it is received with delay. The judgment result is reflected in the execution of the control information.

The redundant explanation is omitted as other respects of the radio receiving apparatus 20B shown in FIG. 14 are similar to the case of the radio receiving apparatus 20A shown in FIG. 8.

Although the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A radio communication system comprising:
   a radio transmission apparatus that includes:
      a first data processing section that is placed at a MAC sub-layer which mediates data transmission between a transport channel and two or more logical channels, and sends out data to the transport channel in such a way that data received from two or more logical channels are integrated, control information to be transferred to an associated entity which is placed at a MAC sub-layer of a receiving side is added, and transmission order information representative of transmission order is added; and
      a data transmission section that is placed at a physical layer, receives data transmitted from the first data processing section via the transport channel and transmits the received data by radio; and
   a radio receiving apparatus that includes:
      a data receiving section that is placed at a physical layer, receives data transmitted by radio and transmits the data to a transport channel; and
      a second data processing section that is placed at MAC sub-layer which mediates data transmission between the transport channel and two or more logical channels, and operates in accordance with the control information which is added to the data received from the transport channel, so that the control information is removed from the data to separate the data into data associated with individual logical channel and distribute the data to the individual logical channel, wherein
      the second data processing section determines, based on the transmission order information added to the received data, whether the received data is data received in delay out of the transmission order, and as to the control information added to the data received in delay, determines whether the inconvenience is caused when the control information is executed in timing of being received in delay and disregards the control information causing the inconvenience not to be executed.

2. The radio communication system according to claim 1, wherein the first data processing section adds the transmission order information in the control information.

3. The radio communication system according to claim 2, wherein the first data processing section sends out data to the transport channel, when specified type of control information of the control information is added, in such a way that the control information is added, and in addition the transmission order information is added.

4. The radio communication system according to claim 1, wherein the first data processing section sends out data to the transport channel, when specified type of control information of the control information is added, in such a way that the control information is added, and in addition the transmission order information is added.

* * * * *